E. M. SNOW.
CORNER FOR CONVEYERS FOR NEWSPAPERS AND THE LIKE.
APPLICATION FILED MAR. 30, 1915.
1,254,941.
Patented Jan. 29, 1918.
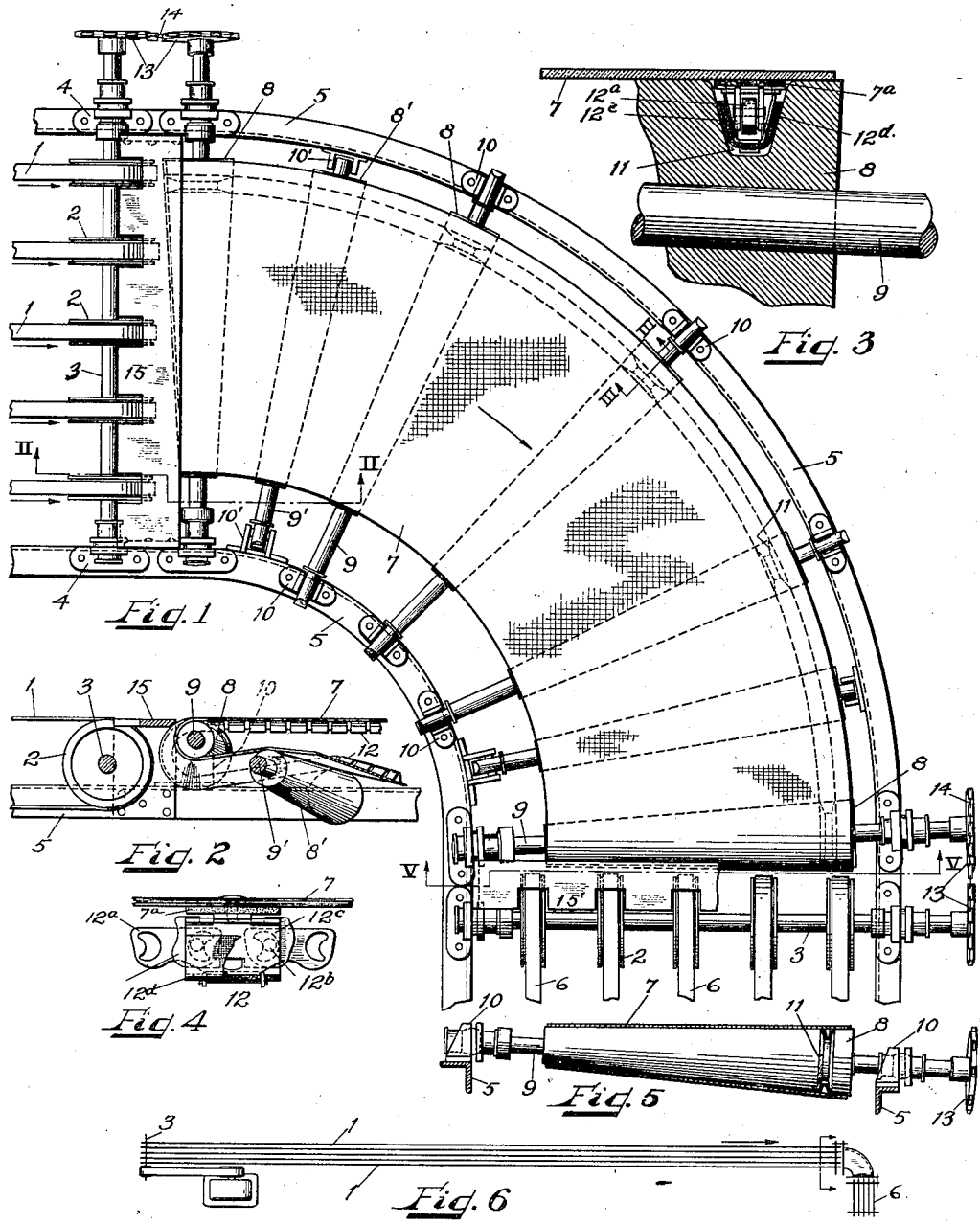

UNITED STATES PATENT OFFICE.

EDWIN M. SNOW, OF LOWELL, MASSACHUSETTS, ASSIGNOR TO THE LAMSON COMPANY, OF BOSTON, MASSACHUSETTS, A CORPORATION OF NEW JERSEY.

CORNER FOR CONVEYERS FOR NEWSPAPERS AND THE LIKE.

1,254,941.     Specification of Letters Patent.    Patented Jan. 29, 1918.

Application filed March 30, 1915. Serial No. 18,131.

*To all whom it may concern:*

Be it known that I, EDWIN M. SNOW, a citizen of the United States, residing at Lowell, in the county of Middlesex and State of Massachusetts, have invented certain new and useful Improvements in Corners for Conveyers for Newspapers and the like, of which the following is a specification.

This invention relates to belt conveyers, and the like, and has for one of its principal objects the provision of improved means in devices of this character, for effecting the translation of articles, such as newspapers, around what are known in the art as "corners."

Another object of the present invention has been to provide a carrying surface in an arcuately curved conveyer, which shall be substantially unbroken.

These and other objects of my invention will be hereinafter referred to and the novel combinations of elements and means whereby said objects may be attained, will be more particularly set forth in the claims appended hereto.

In the accompanying drawing which forms a part hereof and in which like reference characters designate like parts throughout the several views, I have exemplified a preferred construction; but as I am aware of various changes and modifications which may be made herein, without departing from the spirit of my invention, I desire to be limited only by the scope of said claims.

Referring to the drawing:—

Figure 1 is a plan of my improved conveyer corner.

Fig. 2 is a detailed section taken on line II—II of Fig. 1.

Fig. 3 is a detail taken on line III—III of Fig. 1.

Fig. 4 is a detail side elevation of a part of a chain hereinafter referred to.

Fig. 5 is a section taken on line V—V of Fig. 1; and

Fig. 6 is a diagrammatic plan of a belt conveyer provided with the improved corner shown in Fig. 1.

The conveyer leading to the corner, if such a conveyer be used, may be of any suitable description, and in the present exemplification of my invention I have illustrated the said conveyer as one comprising a plurality of strands or small belts 1 which travel around or upon pulleys 2; the latter being mounted upon shafts 3, journaled in bearings 4, mounted upon a frame the side-supports or angle-irons of which have been designated 5.

As shown in Fig. 1, a series of receiving belts 6, may extend substantially at right angles to the belts designated 1; the belts 6 being correspondingly mounted upon pulleys 2, fixedly mounted upon shafts 3, as before.

In order to deliver articles, such as newspapers or the like, from the belts 1 to the belts 6, I prefer to provide a belt conveyer of rather peculiar construction. The belt of this conveyer, designated 7, may be made of canvas or other suitable material; but while the belt is an endless one, it has not straight sides in the known fashion, but rather are its edges arcuate, the one being concentric to the other.

This arcuate belt 7 rides upon a series of rollers 8—8'; those designated 8 being carried by shafts 9, journaled in bearings 10 upstanding from the curved portions the side-supports 5. The rollers 8 support the upper-side of the belt while those designated 8' similarly support the under or return-side of said belt. Rollers 8' may be mounted upon shafts 9', journaled in brackets 10', carried upon the inner or vertical sides of the angle-irons.

All of the rolls 8—8', are preferably tapered or coned as shown, since it is obvious that the inner edge of the belt 7 will travel at a less rate of speed than will its outer edge; and in addition to thus tapering these rolls toward what may be termed the center of the corner, or center of the concentric edges of the belt, the rolls or rollers are also grooved as at 11 for the reception of a suitable beading 12. For this latter I prefer to use a form of silent chain which may be purchased in the open market, and to which I lay no claim aside from the combination thereof with certain other elements of my construction. As shown in Figs. 3 and 4 this chain may comprise links 12ᵃ united by pins 12ᵇ to intermediate or alternate links 12ᶜ. These latter elements are built up of interlocking parts adapted to support and retain in place saddle-like pieces of fabric 12ᵈ which bear against the walls of the groove 11 and thereby retain the arcuate belt 7 in position upon its roll. The belt 7 may be secured to the silent chain, or the equivalent thereof, in any known manner; but I prefer to use said chain and to attach its links 12ᶜ to said belt by rivets or the like; spacing pads 7ᵃ being inserted at the points of attachment to facilitate the flexing of the links around the corner end-rolls.

It will be observed that the outer bearings 10 are disposed at a somewhat lower level than are the corresponding inner-bearings, which causes the shafts 9, to dip downwardly as they extend outwardly from the center above referred to; this provision being made so as to permit of the carrying surface of the belt 7 riding, if desired, in the horizontal plane. Indeed this up-canting of the axes of rotation of the rollers toward the inner ends thereof is essential when it is desired to avoid dishing of the carrying surface.

The belts 1 and 6 are assumed to be driven at substantially the same speed and I prefer to drive the belt 7 also at this same speed by mounting sprocket wheels 13 upon the respective outer extremities of the shafts 9 which carry the said end-rolls, upon opposite sides of the corner, around which the belt 7 makes its 180° turns. Correspondingly similar sprockets 13 are mounted upon the outer extremities of the respective shafts 3 which are nearest to the said shafts 9; and these sprocket wheels are connected to those aforesaid, in pairs, by chains 14.

The operation of the device is as follows:

Articles to be translated around the corner will be carried thereto by the belts 1 and will pass over the apron 15 disposed between the delivering belts 1 and the arcuate or corner belt 7. As the apron 15 is quite narrow, being slotted to receive the pulleys 2, such articles as newspapers will come into operative engagement with the belt 7 before they cease to contact with the belts 1. Thereafter these articles will be smoothly and evenly carried around the corner by the arcuate belt until they pass over the apron 15′ onto the belts 6 which may carry them, if desired, to the points of delivery.

It will be understood, of course, that the chain or other device used to form the bead upon the arcuate belt which rides in the grooves 11, is adapted to not only bend around the end-rolls but to also yield or flex laterally sufficiently to accommodate the arcuate travel of the belt in the horizontal plane.

In general, so far as I am aware, in arcuately traveling conveyers, of which none seem to have been adapted to the conveyance of newspapers or the like,—there has never been an attempt to provide intermediate tapered rollers, between the end rollers, whereby to properly support the carrying surface; two tapered rollers having heretofore apparently been the greatest number embodied in an arcuately traveling conveyer. The novel side-slip preventing rib, or the equivalent thereof, which I provide, preferably, upon the inner side of the belt, greatly favors the proper co-action of said belt with such intermediate rollers, and the combination of these parts is believed to be broadly new.

Having thus described my invention what I claim is:

1. An arcuate conveyer comprising a belt of fabric, flexible in all directions, and lower sides which travel in opposite directions and presenting a carrying surface the inner and outer edges of which are arced, grooved means for supporting said carrying surface, and a laterally flexible, extended bead upon said belt for engaging said grooved means to hold said belt against lateral displacement, said bead projecting from said belt a distance at least twice the thickness of said belt.

2. A conveyer comprising a belt having upper and lower sides which travel in opposite directions and presenting a carrying surface the inner and outer edges of which are arced, grooved means for supporting said carrying surface, and a linked bead upon said belt for engaging said grooved means to hold said belt against lateral displacement.

3. An arcuate conveyer comprising a belt of fabric, flexible in all directions and having upper and lower sides which travel in opposite directions and presenting a carrying surface the inner and outer edges of which are arced, recessed means for supporting said carrying surface, and means upon a surface of said belt other than the carrying surface thereof for engaging said recessed means to hold said belt against lateral displacement with respect to its normal arcuate line of travel.

4. An arcuate conveyer comprising a belt of fabric, flexible in all directions and having upper and lower sides which travel in opposite directions and presenting a carrying surface the inner and outer edges of which are arced, rotatable recessed means for supporting said carrying surface, and means upon a surface of said belt other than the carrying surface thereof for engaging said recessed means to hold said belt against lateral displacement with respect to its normal arcuate line of travel.

5. An arcuate conveyer comprising a belt of fabric, flexible in all directions and presenting a carrying surface the inner and outer edges of which are arced, recessed belt guiding means, and projections on said belt to enter said recessed belt guiding means and co-acting therewith to hold said belt against lateral displacement with respect to its normal arcuate line of travel, said projections being so disposed with respect to the carrying surface of the belt as to leave substantially unimpaired the flexibility thereof in all directions, as aforesaid.

In testimony whereof I have affixed my signature, in the presence of two witnesses.

EDWIN M. SNOW.

Witnesses:
 THOMAS H. WARD,
 J. E. SEARLE.